United States Patent [19]
Romatzick, Jr. et al.

[11] Patent Number: 5,245,219
[45] Date of Patent: Sep. 14, 1993

[54] MARINE POWER Y-ADAPTER

[75] Inventors: David H. Romatzick, Jr., Hamden; Edgar Altena, Milford, both of Conn.

[73] Assignee: Hubbell Incorporated, Orange, Conn.

[21] Appl. No.: 494,498

[22] Filed: Mar. 16, 1990

[51] Int. Cl.$^5$ .................... H02J 3/38; H01H 83/18; H02H 3/38

[52] U.S. Cl. ........................ 307/71; 307/87; 307/130

[58] Field of Search .................. 307/1, 3, 18, 19, 29, 307/43, 71, 77, 78, 87, 130, 131, 147, 9.1; 361/187, 246

[56] References Cited

U.S. PATENT DOCUMENTS

| | | | |
|---|---|---|---|
| 3,213,362 | 10/1965 | Silliman et al. | 307/87 |
| 4,204,243 | 5/1980 | Ross | 361/245 |
| 5,160,852 | 11/1992 | Charles et al. | 307/77 |

OTHER PUBLICATIONS

Published advertisement titled "Double Energy", Charles Marine Products (published before Jan. 4, 1990).

Primary Examiner—A. D. Pellinen
Assistant Examiner—Richard T. Elms
Attorney, Agent, or Firm—Jerry M. Presson; Walter C. Farley

[57] ABSTRACT

A "Y" adapter for supplying power to a marine vessel from a dockside power center having two receptacles includes two three-pole plugs insertable into the receptacles, a third four-pole plug for connection to the wiring system of the vessel and a sensing and control unit for selectively switching paths between these plugs. All conductor lines are switchable to the third plug and between the input plugs by a voltage and phase sensing unit and contactor arrangement. Energization of one input plug while the other one is plugged into a receptacle is prevented and other dangerous voltage circumstances are also prevented.

27 Claims, 2 Drawing Sheets

MARINE POWER Y-ADAPTER

This invention relates to an adapter unit for safely supplying electrical power to a marine vessel from a dockside power center.

BACKGROUND OF THE INVENTION

When a boat or small ship is moored at a dock or the like, electrical power is commonly supplied from a shore or dockside power center which includes at least two electrical receptacles into which cables from the vessel can be inserted. Such a power center commonly has two or more identical receptacles each supplying 120 volts AC. If all of the equipment aboard the vessel is designed to operate at that same voltage, there is no problem. However, if equipment such as blower motors, pumps or the like are wired for 208–240 volt power, that equipment may either not operate at all or operate at a low speed and overheat because of improper voltage. Thus, it is common for a boat owner to make or buy a "Y" adapter with two male 120 volt plugs connected to a single 125/250 volt connector having female contacts. The 125 volt plugs are then inserted into the two receptacles on the dockside power center and the single 125/250 volt connector is plugged into the marine vessel ship-to-shore cable set as an input to the receptacle on the vessel. The electrical wiring for the vessel is connected to this receptacle.

While this solution is an improvement, it is possible for an unwary user to disconnect one of the male plugs and be exposed to line voltage on the contact blades of the male plug.

SUMMARY OF THE INVENTION

Accordingly, an object of the present invention is to provide a "Y" adapter which includes cables with two male plugs to be inserted into the dockside power center and a single connector for supply to the marine vessel, but which prevents the possibility of dangerous voltage being supplied to one of the male plugs if it is not inserted into, or is removed from, the receptacle at the dockside power center.

A further object is to provide such an adapter which prevents the supply of power if the power center is not properly wired, thereby precluding the existence of a dangerous condition.

Briefly described, the invention comprises an adapter unit for forming a safe connection between first and second plug connectors matable with first and second line voltage electrical receptacles on a dockside power center with a third connector to provide a voltage supply equal to the sum of both input line voltages to a marine vessel at dockside. The adapter unit includes first and second means electrically connectable to the first and second plug connectors, each of the first and second means including phase, neutral and ground conductors. Third means is provided for interconnecting the adapter unit and the marine vessel, the third means including two phase conductors, a neutral conductor and a ground conductor, the third means being connectable to the vessel supply. Within the adapter are circuit means for connecting the ground conductors from the first and second plug connectors directly to the ground conductor in the third conductor means. Normally open switchable circuit means selectively connects the phase and neutral conductors from the first and second plug connectors to the other of the phase and neutral conductors in the third means and selectively connects the neutral conductors from the first and second plug connectors together. Control means for selectively closing the switchable circuit means includes fourth circuit means connected to the phase conductors from the first and second plug connectors and is responsive to a predetermined difference in voltage therebetween to close the switchable circuit means.

BRIEF DESCRIPTION OF THE DRAWINGS

In order to impart full understanding of the manner in which these and other objects are attained in accordance with the invention, particularly advantageous embodiments thereof will be described with reference to/the accompanying drawings, which form a part of the specification, and wherein.

DESCRIPTION OF THE PREFERRED EMBODIMENTS

Figure 1:
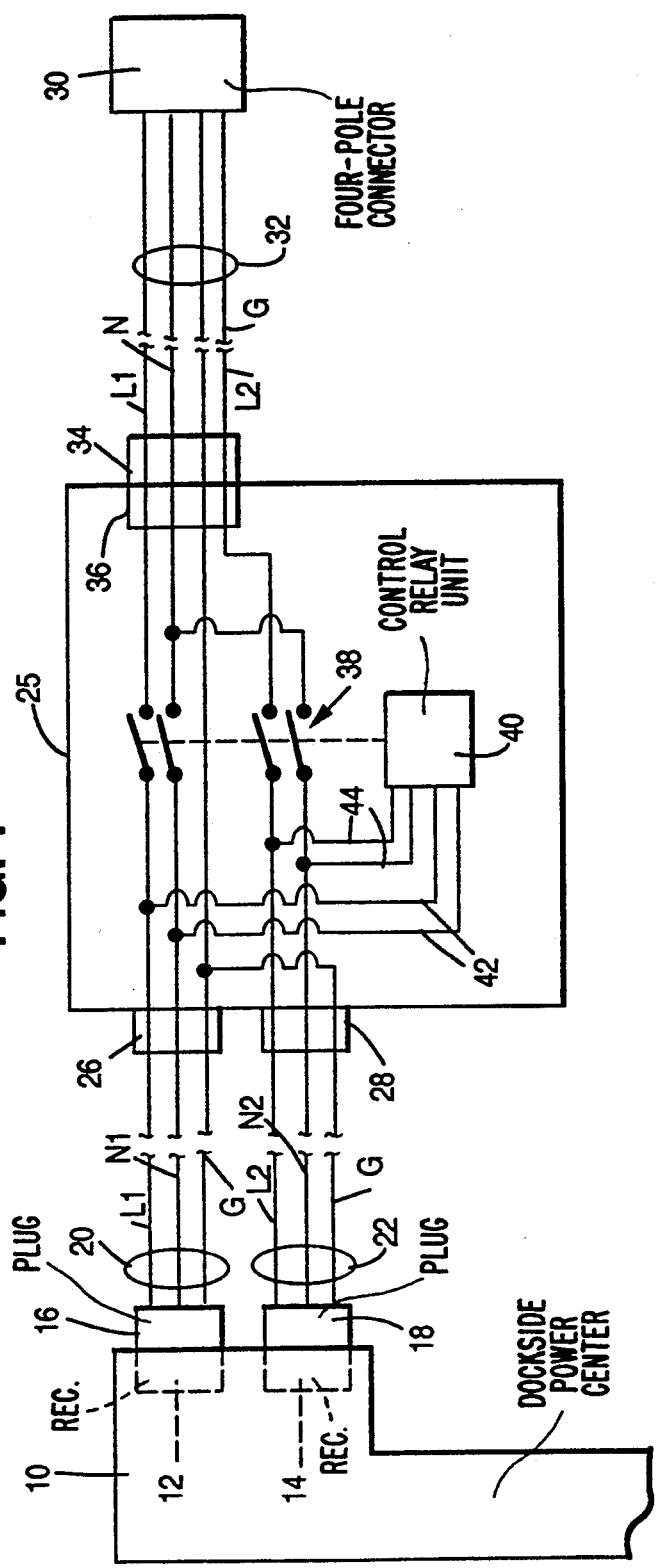
FIG. 1 is a schematic circuit diagram, in simplified form, of an adapter unit in accordance with the present invention with cables and connectors for connection to a dockside power center and a marine vessel.

FIG. 1 illustrates the overall arrangement of a "Y" adapter in the context in which it is used, the overall function of the adapter being to safely connect two cables attached to receptacles into one cable connectable to a marine vessel. A dockside power center 10 is provided with electrical receptacles 12 and 14 which are not illustrated in detail because they are conventional receptacles of a type having three female conductive elements arranged in a standard pattern to received the blades of conventional plugs. The receptacles 12 and 14 are wired to have a phase or "hot" conductor L1 or L2, a neutral conductor N1 or N2, and a ground conductor G. When supplying a vessel, three-pole plugs 16 and 18 are inserted into these receptacles, the plugs being mechanically and electrically attached to cables 20 and 22 which have, respectively, L1, N1 and G wires and L2, N2 and G wires therein. At the other end, cables 20 and 22 are connected to an adapter unit 25 in any convenient fashion. Cables 20 and 22 can be provided with end connectors 26 and 28 mating with suitable receptacles on the adapter unit itself. Alternatively, the conductors within cables 20 and 22 can be wired directly into the adapter unit at terminal strips or in any form of connector in which case the cables form part of the adapter unit itself.

At the other side of adapter unit 25 is a four-pole connector 30 of a type which is selected to be compatible with the electrical connector of the marine vessel itself, connector 30 being at one end of a cable 32, the other end of which can be connected to a plug 34 which mates with a receptacle 36 and adapter unit 25. The plug and receptacle 34 and 36 can also be replaced by a "hard wired" arrangement in which case the cable forms part of the adapter unit itself. Cable 32 is a four-conductor cable having neutral and ground conductors and also phase conductors L1 and L2.

Within the adapter unit illustrated in FIG. 1, an electrical conductor directly interconnects the G (ground) from the first connector means 16 to the receptacle and plug 36 and 34 at the vessel side of the adapter. By "directly" it is meant that this conductor is electrically uninterrupted as it passes from one side of the adapter unit to the other, regardless of how many mechanical interconnections might exist within or at the limits of the adapter unit itself.

In the simplest form, shown in FIG. 1, the ground conductor G in cable 22 is connected directly within the adapter unit to the ground conductor G of cable 20. Conductors L1, N1 and L2, N2, however, are connected to terminals of a four-pole, single-throw contact set indicated generally at 38. On the other side of the contact set to which conductor L2 is connected, a second conductor L2 extends through the connector arrangement 36, 34 and into cable 32. The neutral conductor N2 is connected, on the vessel side of the contact set, to neutral conductor N1. Thus, when the contact set is open, conductors L1 and L2 in cable 32 have no power applied to them.

Contact set 38 is switchable by the action of a sensor and control relay unit 40. Unit 40 has a pair of conductors 42 connected to the L1 and N1 conductors of cable 20 and a pair of conductors 44 connected to the L2 and N2 conductors of cable 22.

With this arrangement, the control relay unit 40 can respond to the voltages on phase conductors L1 and L2 and, if the voltage between them is appropriate, relay unit 40 closes contact set 38 and supplies power to connector 30 for supply to the vessel.

The particular conditions under which voltage will be prevented from passing to connector 30 include conditions which involve the removal of one of plugs 16 or 18 from receptacles 12 or 14, respectively. The phase lines L1 and L2 are normally phases of either a two phase or a three phase voltage supply. Thus, a comparison of the voltages between L1 and L2, measured with respect to their neutral conductors, will indicate whether the receptacles 12 and 14 are properly wired and will also indicate whether the connectors are plugged into their respective receptacles. If they are plugged in, a difference of approximately 210 or 240 volts will exist, depending upon whether the supply is three-phase or two-phase. If, for example, plug 18 is removed from receptacle 14, relay unit 40 opens contact sets 38, removing voltage from the blades of plug 18 and eliminating the existence of a condition which could be dangerous to the life of anyone coming in contact with the blades of that plug. The same is true if plug 18 is in receptacle 14 but plug 16 is removed from its receptacle.

Figure 2:
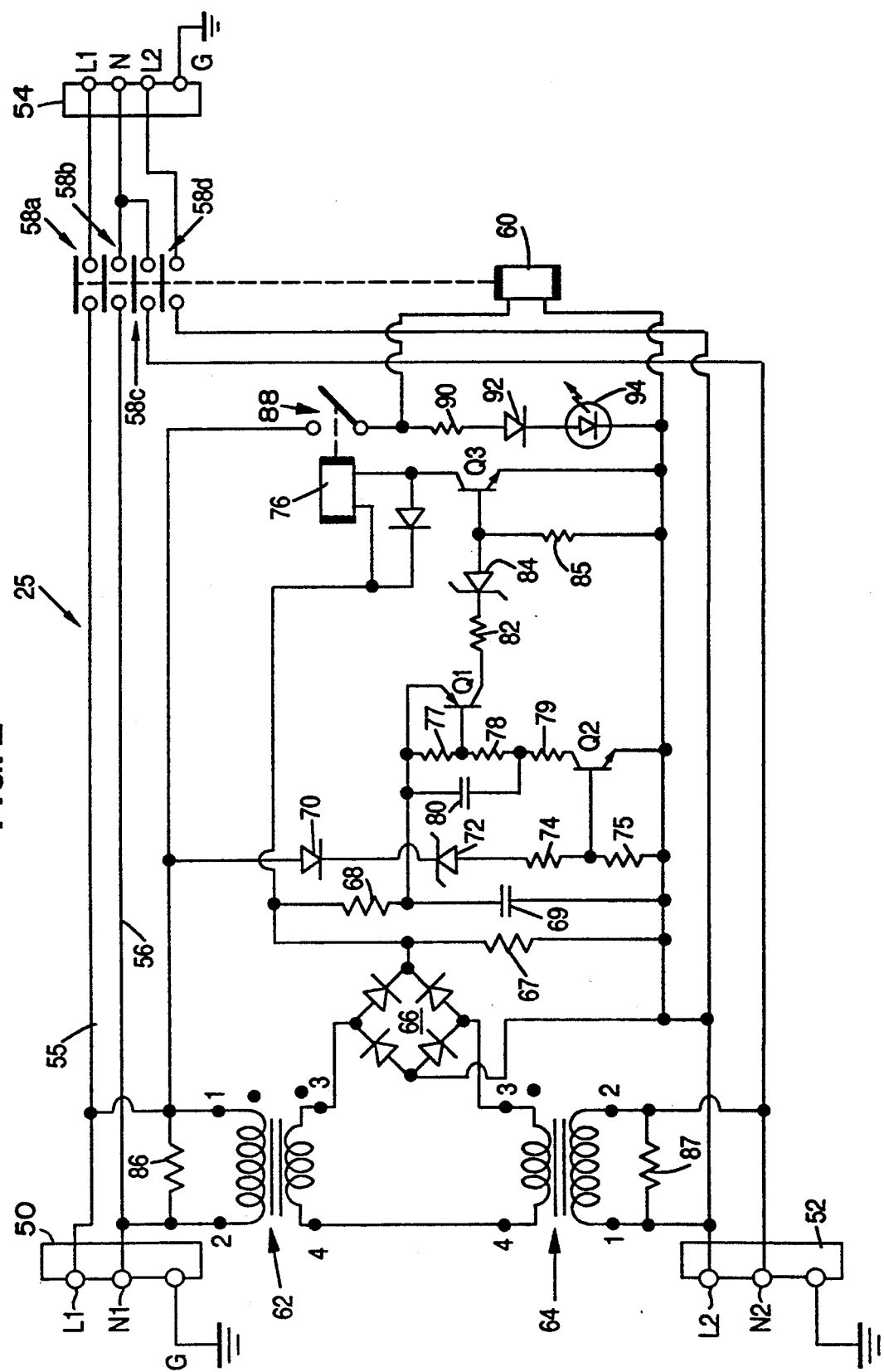
FIG. 2 is a schematic circuit diagram of switchable circuit means and controlled means of the adapter unit of FIG. 1.

FIG. 2 illustrates in greater detail a sensing and switching arrangement which can be employed in an adapter in the context shown in FIG. 1. In the arrangement shown in FIG. 2, connectors 50 and 52 are connected to cables such as 20 and 22 which are connectable to the dockside power center receptacles. A connector 54, at the other side of the adapter unit 25, is connectable to a cable such as cable 32 for supply to the marine vessel. Connector 54 has electrical conductors for phases L1 and L2 as well as the neutral and ground conductors. Wires 55 and 56 are connected to the phase and neutral lines L1 and N1 of connector 50 at one end and to the phase and neutral conductors in connector 54, these wires being interrupted by normally open contact sets 58a and 58b of a four-pole contactor 60. One side of the energizing winding of contactor 60 is connected to phase line L1 on the supply side of contact set 58a through a normally open contact set 88 of a relay 76 and the other side is connected to phase line L2. Contact sets 58d and 58c of contactor 60 selectively open or close phase L2 between connectors 52 and 54 and the neutral line N2 between those same connectors.

The sensing and control circuitry for operating the contactor includes input transformers 62 and 64 which are step-down transformers connected, respectively, to the L1 and N1 lines from connector 50 and the L2 and N2 lines from connector 52. The transformers, phased as illustrated, are connected to the input terminals of a full-wave rectifier 66, the output terminals of which are connected across a resistor 67 and a series resistor-capacitor circuit including resistor 68 and capacitor 69. Note that the lower connection of rectifier 66 is connected to line L2. The junction between the resistor 68 and capacitor 69 is connected to a junction between capacitor 80, resistor 77 and the emitter of a transistor Q1. Diodes 70 and 72 are connected in series circuit relationship with resistors 74 and 75 between the L1 and L2 lines. The junction between resistors 74 and 75 is connected to the base of a transistor Q2, the emitter of which is connected to the "common" line connected to L2.

A resistor 77 is connected between the emitter and base of transistor Q1 and resistors 78 and 79 are connected in series between the base of Q1 and the collector of Q2. A capacitor 80 is connected between the emitter of Q1 and the junction between resistors 78 and 79.

The collector of Q1 is connected through a resistor 82 and a zener diode 84 to the base of a switching transistor Q3, a resistor 85 being connected between the base and emitter thereof. A relay winding 76 is connected in the collector circuit of transistor Q3, relay 76 controlling the operation of single-pole, double-throw contact set 88.

A series circuit including a resistor 90, a diode 92 and a light emitting diode (LED) 94 is connected between contact set 88 and line L2 from connector 52. The other side of the contact set is connected to line L1 from connector 50.

Each of transformers 62 and 64 produces approximately 10 volts at pins 3 and 4 with 120 volts being supplied to each of pins 1 and 2 of L1 and L2. If connectors 50 and 52 and their associated cables and connectors are properly wired, the outputs of transformers 62 and 64 are properly phased to produce a voltage output from rectifier 66 which quickly charges capacitor 69 to a level exceeding the threshold of zener diode 84, i.e., 180° out of phase with a single phase supply and 120° with a 3 phase supply. Upon breakdown of diode 72, pulses of voltage are supplied to, transistor Q2 which is rendered conductive which puts transistor Q1 into saturation. Capacitor 80 keeps Q1 in saturation between pulses. The Q1 current breaks down zener diode 84 which renders Q3 conductive, energizing relay 76 which closes contact set 88. This completes a circuit between lines L1 and L2 through the energizing winding of contactor 60, energizing that contactor and closing contact sets 58a–d. Lines L1 and L2 are also 180° or 120° out of phase to provide a voltage difference across contactor 60 sufficient to firmly energize that contactor. When the contactor is closed, voltage is supplied to connector 54.

Additionally, when contact set 88 closes, a circuit is completed for LED 94 which is preferably a red-emitting LED used as an indicator to display the fact that power is being supplied to the vessel connector.

The sensing and control circuit is intended to be sure that all of the proper conditions are present for safe energization of the contactor and supply of voltage to connector 54. One condition is to be sure that 120 volts is present at each of phase conductors L1 and L2. The second condition is to be sure that L1 and L2 have voltages of the proper polarity and, finally, to be sure that L1 is either 120° or 180° out of phase with respect to L2, depending on whether the source for the dockside power center is single-phase or three-phase.

As to the first condition, if either L1 or L2 is open, one side of the energizing winding of contactor 60 will simply "float", preventing energization of the contactor. Thus, even if relay 76 was energized, there is no voltage difference for illuminating the LED or energizing contactor 60, and there is no connection from the plugged-in phase to the phase which is not plugged in.

As to the phase relationship between L1 and L2, as will be recognized, if these two lines are in phase, the voltage difference between L1 and L2 is always zero. Thus, contactor 60 cannot be energized.

Checking the proper polarity of L1 and L2 requires operation of the sensing circuit. Without relay 76 in the circuit, it would be possible to energize contactor 60 with only 120 volts instead of 240 volts. Under these circumstances, a contactor designed for 240 volt operation would "buzz" and a slight inadvertent impact could cause the contactor to close and latch at half voltage. This would be a dangerous condition and must be avoided. Relay 76 prevents this condition, as follows. As previously mentioned, transformer 62 and 64 transform the 120 volt line voltage to 10 volts AC, respectively. If the connectors or cables are wired such that L1 and N1 are reversed, then pin one of transformer 62 is in phase with pin one of transformer 64. In this condition, the 10 volt outputs of 62 and 64 cancel and the voltage supplied to rectifier 66 is zero. Thus, there is no power to energize relay 76. The same circumstance exists if L2 and N2 are reversed. Thus, no power can be provided to the vessel.

The sensing circuit including transistors Q1 and Q2 and zener diode 72 prevents contactor 60 from being energized when supplied with 120 v., a condition which could exist if the contactor was connected between L1 and L2 which either L1, N, reversed or L2, N2 reversed (i.e., wired wrong) and with L1 and L2 being in phase. The winding of contactor 60 is rated for 208/240 VAC, but when supplied with 120 V the contactor starts buzzing and can close with only one-half rated voltage. The sensing circuit senses the instantaneous voltage between L1 and L2. If that voltage is 208-240 V., zener diode 72 breaks down and the circuit operates as described above. At 120 volts, the zener diode is blocked, transistor Q1 remains nonconductive and relay 76 remains deenergized.

A special case exists if both of the lines are reversed, i.e., both L1 and N1 are reversed and also L2 and N2. The circuit as illustrated does not recognize two reversals as being an undesirable condition. Thus, relay 76 will energize, closing contact set 88. However, contactor 60 will not be energized because it is connected between two neutral lines between which the voltage is zero.

Resistor 67 performs the function of being a load resistor, limiting the no-load voltage to the circuit. A no-load condition will occur with a phase reversal in a three phase circuit in which the zener diode 72 is blocked and relay 76 is not energized.

It is important for the circuit to prevent a dangerous voltage from being present on the prongs of one plug, as previously mentioned, when the other is inserted into an receptacle. The contactor 60 is not closed under these dangerous circumstances, preventing lethal power from being present on the plug which is not properly in its receptacle. It is possible for the electronic circuit to permit some leakage from line L1 to L2 through the circuit including transformer 62, full-wave rectifier 66, resistor 68 and capacitor 69 and through transformer 64. Because they are directly connected across the phase conductors $L_1$, $L_2$, a path for leakage current also exists through series-connected diodes 70 and 72 and resistors 74 and 75. This voltage is limited to about 12 volts AC by resistors 86 and 87 which are connected in parallel with the primary windings of the transformers. These resistors absorb leakage, resistor 86 absorbing leakage from L2 to L1 and resistor 87 absorbing leakage from L1 to L2. Resistor 68 is used to limit the initial in-rush current when capacitor 69 begins to charge. It would thus be possible for a person holding one plug and touching its prongs while inserting the other plug into its receptacle to sense this leakage. However, the voltage reaching the individual's body would be quite low and of short duration and is not regarded as being significant.

While certain advantageous embodiments have been chosen to illustrate the invention, it will be understood by those skilled in the art that various changes and modifications can be made therein without departing from the scope of the invention as defined in the appended claims.

What is claimed is:

1. An adapter unit for forming a safe connection between first and second plug connectors matable with first and second line voltage electrical receptacles on a dockside power center with an output connector to provide to a marine vessel at dockside, a voltage supply approximately equal to the sum of both line voltages, said adapter unit comprising the combination of first and second conductor means respectively electrically connected to said first and second plug connectors, each of said first and second conductor means including phase, neutral and ground conductors;

third conductor means for interconnecting said adapter unit and the marine vessel, said third means including two phase conductors, a neutral conductor and a ground conductor, said third means being connectable to the vessel's electrical system, the ground conductors of said connector means providing continuous grounding of all of said connector means;

normally open switchable circuit means for selectively connecting the phase conductors from said first and second plug connectors to said phase conductors of said third means and for selectively connecting the neutral conductors from said first and second plug connectors together and to said neutral conductor of said third means; and control means for selectively closing said switchable circuit means, said control means including circuit means coupled to said phase conductors from said first and second plug connectors for sensing the polarity and phase of the voltages on the phase conductors and as a consequence, producing undesired voltage on one of said plug connectors;

voltage-summing means connected to said circuit means for sensing polarity and phase and being responsive to a predetermined difference in voltage between said phase conductors to close said switchable circuit means, thereby to provide a voltage approximately equal to the sum of said line voltages to said third conductor means, said voltage-summing means coupled directly across said phase conductors and, as a consequence, creating a path for undesired current flow between said plug connectors; and impedance means coupled to said first and second conductor means for reducing undesired voltage and undesired current flow to a predetermined value which is safe to a user in electrical contact with one of the plug connectors while the other plug connector is mated with and receives power from one of the electrical receptacles.

2. A unit according to claim 1 wherein said switchable circuit means includes a contactor having an energizing winding and a normally open contact set in each of said phase conductors and each of said neutral conductors between said third conductor means and said first and second plug connectors.

3. A unit according to claim 2 wherein said circuit means includes first and second step-down transformers having their primary windings connected, respectively, to said phase and neutral conductors of said first and second means and their secondary windings connected on one side to each other so as to produce an output voltage of preselected magnitude when the voltages on said two phase conductors are at normal line voltage levels and at least about 120° apart in phase.

4. A unit according to claim 3 wherein said voltage-summing means includes a relay having an energizing winding and a normally open contact set in series circuit relationship with said contactor energizing winding and one of said phase conductors;

rectifier circuit means connected to receive said output voltage of said transformers and to produce a DC output voltage proportional thereto;

voltage sensitive semiconductor switch means connected to the output of said rectifier circuit means and to said relay energizing winding for energizing said winding when said rectifier output exceeds a preselected voltage level.

5. A method of forming a safe connection between first and second plug connectors matable with first and second line voltage electrical receptacles, respectively, on a power center with an output connector means to provide a voltage supply approximately equal to the sum of line voltages at the two receptacles from the output connector means to a power user at the center, the method comprising the steps of providing first and second electrical conductor means respectively electrically connected to the first and second plug connectors, each of the first and second conductor means including a phase, neutral and a ground conductor, providing third conductor means for supplying voltage to the output connector means, the third conductor means including two phase conductors, a neutral conductor and a ground conductor, providing normally open switchable means actuatable for selectively connecting the phase conductor from each of the plug connectors to the corresponding phase conductors of the third conductor means and for selectively connecting the neutral conductors from said first and second plug connectors to the neutral conductor of the output connector means;

establishing uninterruptable paths to ground potential for all of said ground conductors and maintaining said ground conductors free of current;

independently sensing the phase and the amplitudes of voltages on the phase conductors of the first and second conductor means and creating at least one path for current to flow towards one of said plug connectors during said sensing, and actuating the switchable circuit means to connect the respective phase and neutral conductors of all of the connectors only when predetermined voltage and phase relationships between said phase conductor voltages are sensed, and limiting the level of leakage current flow between the first and second plug connectors during voltage sensing to a level which is safe to a user in electrical contact with one of the plug connectors while only the other plug connector is mated with its receptacle and;

reducing in-rush power surges between said first and second plug connectors resulting from the electrical connection of said other one of said plug connectors with its mating receptacle.

6. An adapter unit for forming a safe connection between first and second electrical sources with a load to provide a supply at the load which is the sum of the sources, the adapter unit comprising the combination of first and second connector means electrically connectable respectively to the first and second electrical sources, each of said connector means having neutral and phase electrical conductors;

third connector means for connecting said adapter unit to the load, said third connector means having neutral and phase conductors;

first circuit means coupled across said phase conductors of said first and second connector means for sensing the polarity and phase of voltages on said phase conductors and for producing an output when the voltages are in proper polarity and phase relationship, said first circuit means substantially preventing voltage from one of said first and second connector means connected to one of said sources from reaching the other of said first and second connector means not connected to a source;

second circuit means coupled to the phase conductors and conditioned for actuation by predetermined voltages on said phase conductors and when actuated, connecting said conductors of said first and second connector means to the conductors of said third connector means, the second circuit means normally disconnecting said neutral and phase conductors;

third circuit means connected across the phase conductors of said first and second connector means for measuring the voltage amplitudes at said first and second connector means and for actuating the conditioned second circuit means to connect said conductors of said first and second connector means to the conductors of said third connector means when the measured voltages are in a proper polarity and phase relationship and have voltage amplitudes that sum to produce a desired amplitude output for the load, the connection across said phase conductors creating leakage flow between said first and second connector means; and means coupled to said first and second connector means for reducing the magnitude of leakage current to a safe level and for substantially preventing voltage from said first connector means from reaching the second connector means while only said first connector means is connected to a source.

7. An adapter unit according to claim 6 wherein said electrical conductors include phase, ground and neutral conductors in each of said connector means.

8. An adapter unit according to claim 7 wherein said first and second connector means are male and said third connector means is female.

9. An adapter unit according to claim 6 wherein said third circuit means includes first and second transformers having primary windings connected respectively to said first and second connector means and secondary windings connected together to produce a predetermined output only when said voltages at said first and second connector means are in said proper relationship.

10. An adapter unit according to claim 9 wherein said transformers are step-down transformers.

11. The adapter according to claim 6 and further comprising a grounding conductor for each of said first and second connector means, each of the grounding conductors being directly interconnected to a grounding conductor of said third connector means and being current-free.

12. The adapter according to claim 6 wherein said first circuit means comprises a step-down transformer coupled across said phase and neutral conductors of each of said first and second connector means.

13. The adapter according to claim 12 wherein said first circuit means includes means for rectifying the stepped-down A.C. output of the transformers to produce a D.C. output.

14. The adapter according to claim 12 wherein said means for reducing leakage current flow comprises an impedance coupled between each of the transformers and each of the phase conductors.

15. The adapter according to claim 14 wherein said impedance is a resistor.

16. The adapter according to claim 6 wherein said third circuit means comprises a voltage responsive device connected directly across said phase conductors having a breakdown voltage characteristic which determines the minimum voltage supplied to the third connector means.

17. The adapter according to claim 14 wherein said means is additionally coupled to said second and third circuit means.

18. The adapter according to claim 6 wherein said second circuit means comprises first switching means having contacts for connecting said neutral and phase conductors of said first and second connector means to corresponding conductors of said third connector means when said first switching means is actuated, and wherein said third circuit means comprises second switching means responsive to said output signal from said first circuit means for actuating said first switching means.

19. The adapter according to claim 6 wherein at least part of said third circuit means is coupled directly to said phase conductors of said first and second connector means, and wherein said means for reducing leakage current is connected to said part of said third circuit means.

20. The adapter according to claim 19 wherein each of said connector means have a grounding conductor, the grounding conductors of said first and second connector means being coupled directly to the grounding conductor of said third circuit means.

21. The adapter according to claim 13 and further including impedance means coupling the output of the rectifying means to the second connector means for reducing the magnitude of surge voltages caused by the coupling of said first connector means to the first source.

22. The adapter according to claim 18 and further comprising indicator means coupled to said first switching means for providing an indication as to the state of said contacts.

23. An adapter unit for providing a safe connection from first and second electrical sources of line voltages to a load to supply a voltage to the load which is substantially the sum of the amplitudes of the line voltages, the adapter unit comprising the combination of first and second input connectors electrically connectable to the first and second electrical sources, respectively, to receive line voltages therefrom, each of said connectors having neutral and phase electrical conductors and supplying line voltages to the adapter unit;

an output connector for connecting said adapter unit to the load, said output connector having neutral and phase conductors;

first means connected across said phase conductors and operating in response to two inputs coincidentally applied thereto, one of said inputs being the differential line voltage across the phase conductors of predetermined amplitude and the other input being an actuating signal, said first means operating in response to said inputs to connect said phase and neutral conductors of said first and second connectors to the phase and neutral conductors, respectively, of said output connector, said first means normally disconnecting said phase and neutral conductors of said connectors from each another;

second means coupled across said phase conductors and to said first means for summing line voltage amplitudes, said second means producing said actuating signal for said first means when the amplitudes of the line voltages sum to a predetermined value, and said second means receives an activating signal;

third means coupled to the phase conductors for stepping down the amplitudes of the line voltages received from said phase conductors and for producing said activating signal for operating said second means when the stepped down line voltages are out-of-phase;

said second means providing continuous path means for leakage current when line voltage is fed to only one of said input connectors; and impedance means in said path means for limiting said leakage current to a non-hazardous level.

24. The adapter according to claim 23 wherein said third means includes a step-down transformer coupled to the conductors of each of said input connectors for substantially reducing the amplitudes of said line voltages.

25. A method of forming a safe connection between first and second plug connectors matable with first and second line voltage electrical receptacles on a power center with an output connector to supply a voltage approximately equal to the sum of line voltages at the two receptacles to the third connector, the method comprising the steps of feeding time-varying electrical voltages having phase and amplitude parameters from the electrical receptacles to a different one of said connectors, each of the first and second connectors including a phase, neutral and a grounding conductor;

providing the output connector with at least one phase conductor, a neutral conductor and a grounding conductor, reducing the line voltage amplitudes by substantially the same factor, sensing the polarity and phase of the reduced amplitude line voltages, electrically connecting the phase and neutral conductors of each of the plug connectors to the corresponding phase and neutral conductors of the output connector by means of contact closures in response to the substantially coincident occurrence of a) phase line voltages of predetermined differential amplitude and b) a switching signal;

measuring the amplitudes of the line voltages on the phase conductors of the first and second connectors; and generating said switching signal for said contact closures when the measured amplitudes sum to a predetermined voltage and the sensed reduced-amplitude voltages are determined to be of proper polarity and phase by said sensing, whereupon said phase and neutral conductors of said plug connectors are respectively electrically connected to supply both line voltages to said output connector.

26. The method according to claim 25 wherein the step of phase sensing and amplitude measuring creates an uninterrupted current flow condition between the phase conductors; and further comprising the step of limiting all such flow to a level which is non-hazardous to a user in electrical contact with an unconnected first or second one of the plug connectors.

27. The method according to claim 26 and further comprising the step of reducing in-rush voltage surges between said first and second plug connectors during phase sensing.

* * * * *